United States Patent [19]

Forster

[11] 4,292,275
[45] Sep. 29, 1981

[54] MODULAR CHLORINE DIOXIDE GENERATION SYSTEMS

[75] Inventor: James H. Forster, Mississauga, Canada

[73] Assignee: ERCO Industries Limited, Islington, Canada

[21] Appl. No.: 152,565

[22] Filed: May 22, 1980

Related U.S. Application Data

[62] Division of Ser. No. 45,850, Jun. 5, 1979, Pat. No. 4,251,502.

[30] Foreign Application Priority Data

Jun. 28, 1978 [GB] United Kingdom ............... 28105/78

[51] Int. Cl.³ .......................... F28D 21/00; B01J 19/00
[52] U.S. Cl. ...................................... 422/198; 422/235
[58] Field of Search ................ 422/198, 203, 234, 235

[56] References Cited

U.S. PATENT DOCUMENTS

| | | | |
|---|---|---|---|
| 521,974 | 6/1894 | Cooper | 159/27 A |
| 1,869,093 | 7/1932 | Crewson | 159/27 A X |
| 3,064,721 | 11/1962 | Witte | 159/6 R X |
| 3,895,100 | 7/1975 | Cowley | 423/478 |
| 3,975,506 | 8/1976 | Cowley | 423/500 X |
| 4,079,123 | 3/1978 | Fuller et al. | 423/478 |

*Primary Examiner*—William A. Cuchlinski, Jr.
*Attorney, Agent, or Firm*—Sim & McBurney

[57] ABSTRACT

A modular chlorine dioxide generating unit (10) is disclosed wherein recycled reaction mixture passes along a flow path (18) internally of the generator vessel (12) out of direct fluid flow communication with the reaction medium (13) from the lower end (16) of the vessel (12) to a discharge point in the vapor phase (15) above the liquid level (13) in the generator vessel (12).

11 Claims, 8 Drawing Figures

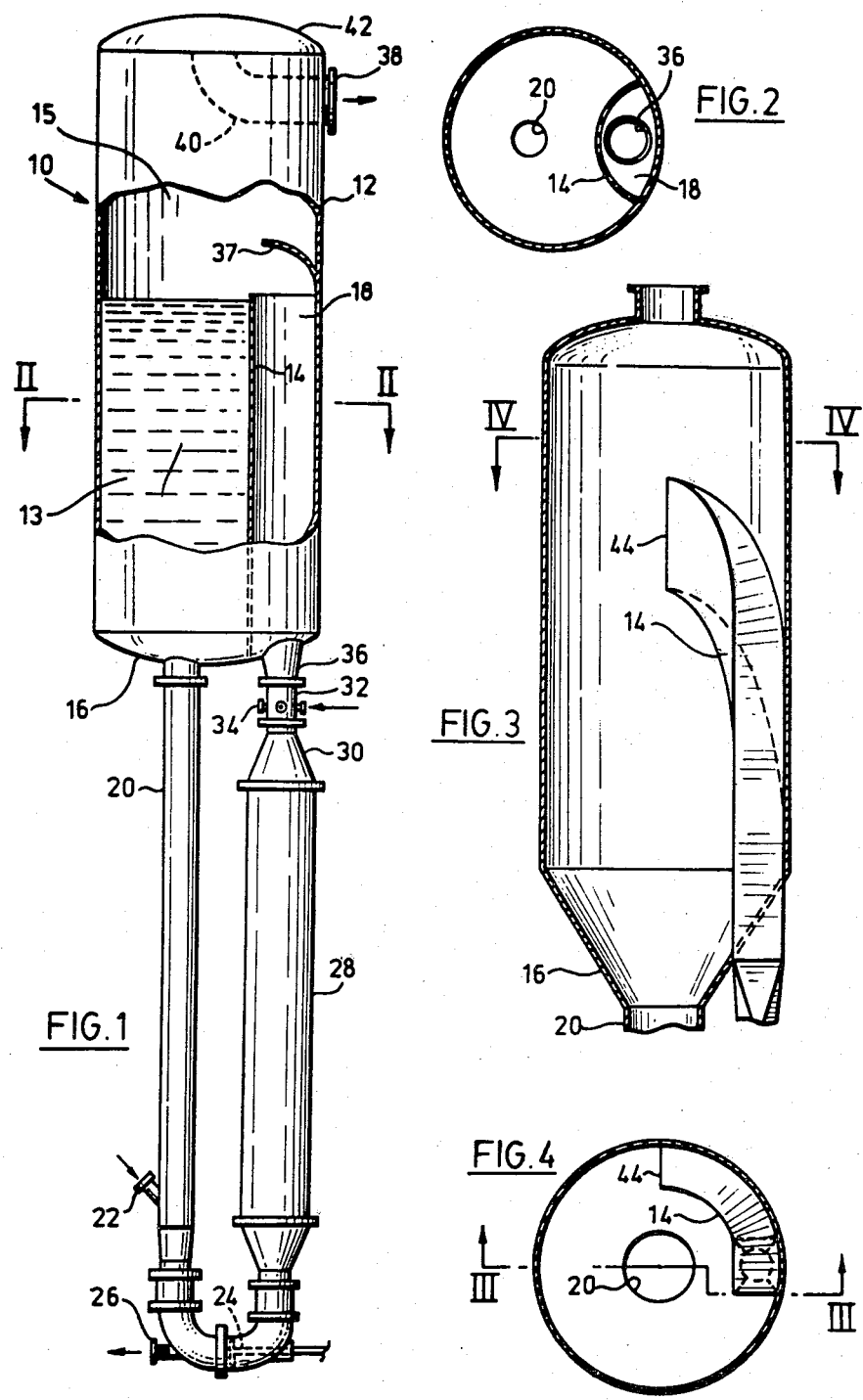

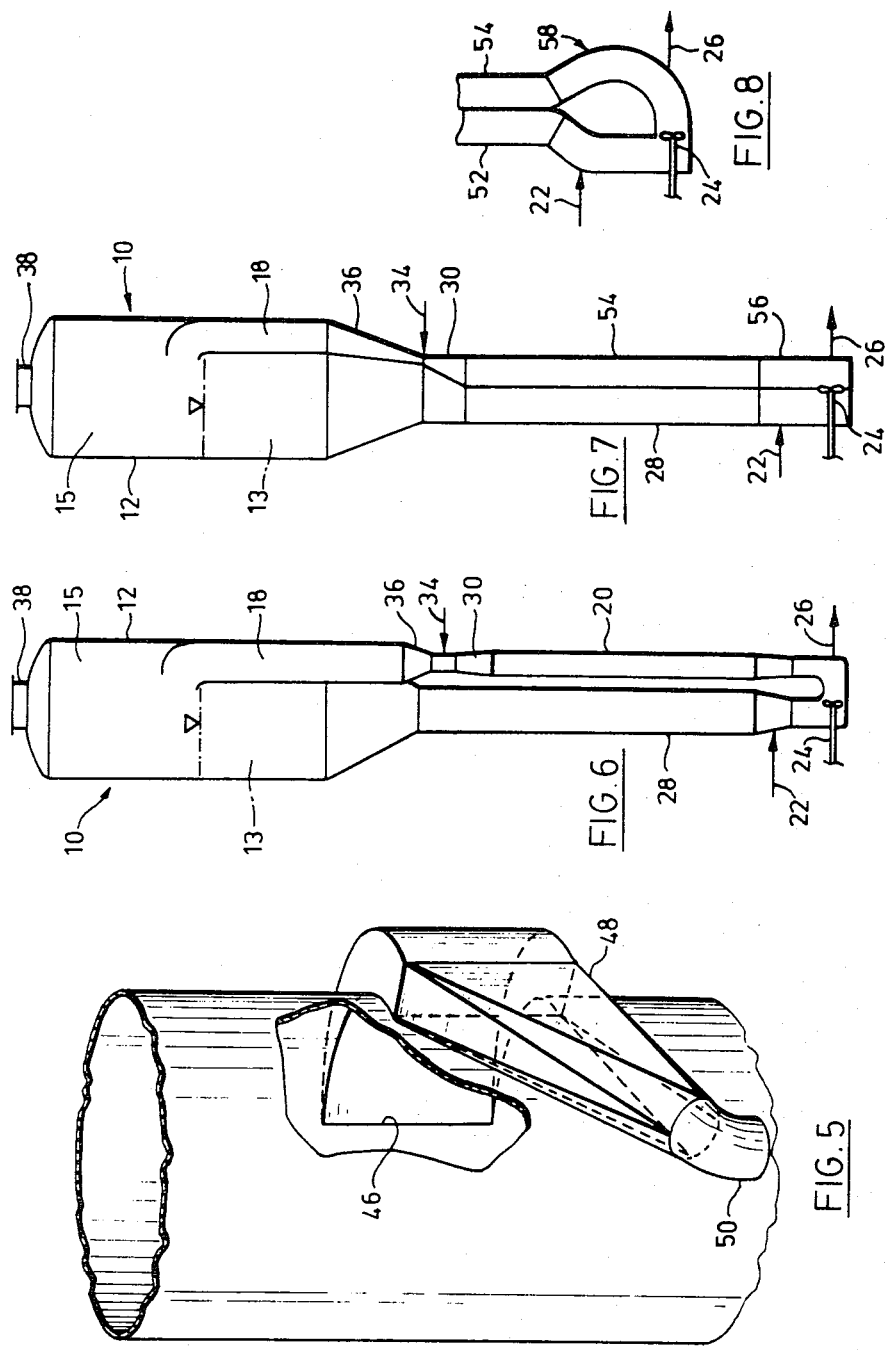

MODULAR CHLORINE DIOXIDE GENERATION SYSTEMS

This is a division of application Ser. No. 045,850 filed June 5, 1979 now U.S. Pat. No. 4,251,502.

FIELD OF INVENTION

The present invention relates to modular chlorine dioxide generating systems or units and to the production of chlorine dioxide using such systems.

BACKGROUND TO THE INVENTION

Chlorine dioxide is utilized in a variety of bleaching operations, particularly in the bleaching of cellulosic fibrous material, such as, wood pulp. In our prior U.S. Pat. Nos. 3,895,100 and 3,975,506 (E107) the disclosures of which are incorporated herein by reference, there is disclosed a chlorine dioxide generating process and equipment therefor wherein chlorine dioxide is formed by reduction of an alkali metal chlorate, usually sodium chlorate, with chloride ions in an aqueous acid reaction medium, in accordance with the equation:

$$ClO_3^- + Cl^- + 2H^+ \rightarrow ClO_2 + \tfrac{1}{2}Cl_2 + H_2O$$

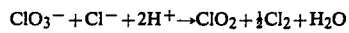

The reaction medium in the generator is maintained at its boiling point, generally about 25° to about 90° C., under a subatmospheric pressure, generally about 20 to about 400 mm Hg, to cause the deposition of a by-product salt from the reaction medium in the generation vessel once saturation has been achieved after start-up and to remove the chlorine dioxide and chloride in gaseous admixture with steam.

The by-product salt which is precipitated depends on the acid used in the reaction medium, the by-product being a sodium sulphate when sulphuric acid is used and sodium chloride and/or hydrogen chloride provide the chloride ion reducing agent, and the by-product being sodium chloride when hydrochloric acid is used and also provides the reducing agent.

When sulphuric acid is used, the sodium sulphate may be in an acidic or neutral form depending on the total acid normality of the generator, with a neutral salt generally being obtained at total acid normalities of about 2 to about 5 normal and acid salts being obtained at higher values usually up to about 12 normal.

When the total acid normality of a sulphuric acid based system is such as to produce neutral sodium sulphate, it is preferred to use a reaction temperature above about 30° C. in order to obtain the anhydrous salt.

When hydrochloric acid is used, the actual hydrogen ion communication in the reaction medium is maintained in the range of about 0.05 to about 0.3 normal. The term "actual hydrogen ion concentration", as used herein, is the value determined by a pH meter calibrated on an 0.1 normal solution of hydrochloric acid on the assumption that such a solution is 100% dissociated at this concentration.

As described in our earlier patents, the solid by-product is removed as a slurry in reaction medium from the generator vessel, sodium chlorate solution is mixed therewith, the mixture is recycled through a reboiler wherein the mixture is heated to the reaction temperature and forwarded to the reaction vessel after the addition of acid to the heated mixture. A portion of the slurry is withdrawn prior to the reboiler for crystal separation.

The heated mixture from the reboiler is passed through a venturi-like pipe which exerts sufficient back pressure on the mixture in the reboiler to prevent boiling therein, acid in concentrated form is introduced to the collar of the venturi and the resultant reaction mixture is allowed to expand at low acceleration to permit boiling and gaseous product formation to occur evenly and gradually and thereby avoid bumping and vibration, so that a fluid mixture of solid phase, liquid phase and gaseous phase enters the generator above the liquid level therein through a curved pipe joining the downstream end of the venturi-like pipe and the generation vessel inlet.

While this prior art procedure represents an excellent commercially-viable chlorine dioxide generating system having many advantages over prior art arrangements, as described in our earlier patents, it does suffer from the drawback that it is not capable of modular manufacture, transportation and installation but rather requires considerable on-site assembly of the reboiler, or other suitable heat exchanger, and recycle pipes. In addition, considerable lateral space beyond the dimensions of the generator vessel is required to accomodate the reboiler and recycle tubes.

SUMMARY OF THE INVENTION

The present invention is directed to improvements in our prior art system wherein a compact modular chlorine dioxide generation system or unit is provided having the heat exchanger and recycle pipes pre-assembled with the remainder of the generation system component parts, thereby avoiding the necessity and expense of on-site assembly and the space requirements of the prior art system.

The provision of the modular unit according to the invention is made possible by providing baffle means in the generation vessel which defines a recycle feed duct extending through the height of the reaction medium in the generation vessel and terminating above the liquid level. This duct communicates at its lower end with the venturi-like pipe and hence with the recycling heated reaction mixture and discharges that mixture into the vapor space of the generation vessel. Thus, the duct is out of direct fluid flow communication with the body of reaction medium in the generation vessel.

By providing the internal duct in this way, the heat exchanger may be located directly below the generation vessel and preferably within the diameter thereof and the outside curved recycle pipe of our prior art structure is eliminated. In this more compact form, the unit may be assembled as a complete module for shipping to the installation site. Further, since the curved outside recycle pipe is eliminated, the lateral on-site space requirements of the modular unit are decreased, as compared with the prior art.

BRIEF DESCRIPTION OF DRAWINGS

FIG. 1 is an elevational view of a chlorine dioxide generation unit constructed in accordance with one embodiment of the invention;

FIG. 2 is a sectional view taken on line 2—2 of FIG. 1;

FIG. 3 is an elevational view of a modified form of the unit of FIG. 1;

FIG. 4 is a sectional view taken on line 4—4 of FIG. 3;

FIG. 5 is a schematic elevational representation of a portion of a further modified form of the unit of FIG. 1;

FIG. 6 is an elevational view of a chlorine dioxide generation unit constructed in accordance with a second embodiment of the invention;

FIG. 7 is an elevational view of a chlorine dioxide generation unit constructed in accordance with a third embodiment of the invention; and FIG. 8 is an elevational view of an alternative form of pump chamber for the embodiment of FIG. 7.

DESCRIPTION OF PREFERRED EMBODIMENTS

Referring first to FIGS. 1 and 2, a modular chlorine dioxide generating unit 10 comprises a generally cylindrical upright generator vessel 12 containing a chloride dioxide generating reaction medium 13 which may be sulphuric acid-based or hydrochloric acid-based, as discussed in detail above. The reaction medium 13 is maintained at its boiling point to effect water evaporation and the Vapor space 15 above the reaction medium 13 is maintained under a subatmospheric pressure. Once the reaction medium 13 becomes saturated after start-up, a by-product salt is precipitated continuously from the reaction medium.

The generator vessel 12 may be constructed of any suitable corrosion resistant material, preferably titanium owing to its high corrosion resistance and strong structural qualities.

The generator vessel 12 is provided with an internal baffle 14 which extends upwardly through the reaction medium 13 from a lower outwardly dished closure wall 16 to above the height of the intended liquid level of the reaction medium 13 in the generator vessel 12 and defines an elongate passageway or duct 18 between the baffle 14 and the internal wall of the generator vessel 12 which is out of direct fluid flow communication with the reaction medium 13 in the generator vessel 12.

The provision of an outwardly disposed closure wall 16 at the lower end of the generator vessel 12 contrasts with the conical structure utilized in the generation vessel described in our prior U.S. patents mentioned above. The dished structure is preferred in the illustrated embodiment of FIGS. 1 and 2 to accommodate in simple manner the other structural modifications required to provide the modified generation unit of this invention. A conical lower portion may be used, however, as is illustrated in the embodiment of FIGS. 3 and 4.

The lower outwardly dished closure wall 16 of the generator vessel 12 communicates with a vertical slurry removal pipe 20 for the removal of a slurry of by-product solid from the generator vessel 12. An inlet pipe 22 is provided to the slurry removal pipe 20 for the introduction of sodium chlorate solution to the slurry. The sodium chlorate solution also contains sodium chloride when sulphuric acid is the acidic reactant whereas the sodium chloride is omitted when hydrochloric acid is the acidic reactant. A separate sodium chloride feed stream may be used, if desired. If the acidic reactant is provide by a mixture of sulphuric and hydrochloric acids wherein the hydrochloric acid is sufficient to provide all the chloride ions for the process, then sodium chloride may be omitted.

A recycle pump 24 of any suitable construction is provided at the lower end of the slurry removal pipe 20 for pumping part of the slurry back to the generator vessel 12. A slurry discharge pipe 26 also is provided at the lower end of the slurry removal pipe 20 for transfer of part of the slurry to suitable separation equipment for the separation of the solid crystals from entrained reaction medium, the separated entrained reaction medium being recycled to the generator vessel 12 in any conveninet manner.

A vertical reboiler 28, of any convenient construction, or other suitable heat exchanger, is provided extending substantially parallel to the slurry removal pipe 20 and in communication at its lower end with the discharge side of the recycle pump 24 to receive pumped slurry for heating to the reaction temperature therein. The relative positions of the pipe 20 and the heat exchanger 28 may be reversed but this arrangement is less preferred.

At its upper end, the reboiler 28 communicates with a first frusto-conical member 30 of decreasing cross-sectional area in the direction of flow of the liquor and terminating in a cylindrical collar 32 having a plurality of acid inlets 34 located around the periphery thereof for feed of acid, preferably in concentrated form, into the recycling medium. Any desired number of such inlets 34 may be provided, although preferably four are provided in diametrically-opposed pairs right-angularly arranged with respect to each other.

On the downstream side of the collar 32, there is provided a second frusto-conical member 36 of increasing cross-sectional area in the direction of fluid flow and which terminates at the bottom closure 16 of the generator 12 in communication with the passageway 18.

As explained in detail in our U.S. Pat. Nos. 3,895,100 and 3,975,506, the arrangement of frusto-conical members 30 and 36 on either side of the short cylindrical collar 32 in a venturi-like pipe structure results in acceleration of liquid leaving the reboiler 28 in the first frusto-conical member 30 to a high velocity while the back pressure induced by the decreasing cross-sectional dimension and acceleration exceeds the difference in saturation vapor pressure between that of the liquid present and that of the generator. In this way, boiling of recycled heated liquor in the tubes of the reboiler 28 is avoided.

Once the acid has been introduced in the collar 32 causing rapid mixing with the liquid, the mixture is expanded at low acceleration in the second frusto-conical member 36, so that boiling of the liquid and gaseous product release is brought about evenly and gradually. Since the liquid commences to boil and chloride dioxide and chlorine start to form on the downstream side of the collar 32, the material which enters the passageway 18 is mainly gaseous with entrained amounts of liquid and solid suspended therein.

The resulting fluid mixture enters the gas space 15 of the generator vessel 12 at a fairly low velocity, for example, about 20 to about 50 ft/sec (about 7 to about 17 m/sec). A baffle 37 is provided at the upper end of the passageway 18 to direct the fluid generally horizontally and radially inwardly of the internal wall of the generator vessel 12.

In the embodiment illustrated in FIG. 1, a gas discharge outlet 38 for removal of gaseous chlorine dioxide, chlorine and water vapor from the generator vessel 12 communicates with a pipe 40 which extends radially through the side of the generator vessel 12 adjacent the upper end thereof and is upwardly curved at its inner end to provide its inlet opening towards but spaced from a top closure 42 of the generator vessel 12 and located axially of the generator vessel 12. This arrangement assists in the separation of entrained liquid from the gaseous products in the vapor space 15 by inducing the gaseous material to turn through 180° to enter the pipe 40 before being able to exit from the generator vessel 12 through outlet 38. This movement induces entrained droplets to fall out of the gaseous phase towards the reaction medium 13, so that the discharged gaseous phase has a lower entrained liquid concentration.

This latter arrangement contrasts with the conventional system which has its gaseous outlet generally axially located in the top closure of the generator vessel so that the gaseous products pass out of the generator vessel 12 in a straight line path. Such a conventional arrangement may be used, if desired, as seen in FIGS. 3 and 4.

The illustrated arrangement for decreasing liquid entrainment in the removed gaseous phase contrasts with conventional demisting devices, generally consisting of a metal mesh structure, which have been suggested for chlorine dioxide generation systems of the evaporation type. Such demisting devices are prone to clogging by deposited solid material and must be cleaned from time to time, and hence are generally unsatisfactory.

In addition to the advantage of less liquor entrainment in the product gas stream using the illustrated structure of discharge outlet 38 and pipe 40, there is an additional advantage that less overall height is required since the outlet pipe 38 may communicate directly with the inlet of adjacent condensation equipment rather than requiring pipes which extend first vertically upwardly from a top closure outlet and then downwardly to the condensation equipment inlet.

The arrangement of the reboiler 28 and the reaction mixture recycle line in the illustrated embodiments in relation to the generator vessel 12 is quite different from the structure of our prior U.S. patents described above. Thus, in the generation unit 10 of this invention, part of the recycle line from the acid inlet to the discharge above the liquid level in the generator vessel 12 is provided by the passageway 18 within the outer wall of the generator vessel 12 itself, in contrast to our prior arrangement where the recycle line included an inwardly-curved pipe located wholly outside the generator vessel 12.

The later provision of the vertically-directed passageway 18 from the lower closure wall 16 to above the level of the reaction medium 13 permits a much more compact overall structure to be provided which can be pre-assembled for shipping and then shipped in modular form, so that on-site assembly is avoided and hence this expense of the prior art structure is eliminated.

Additionally, since the external recycle pipe of the prior art structure is eliminated, the lateral space requirements of the overall unit 10 are decreased and this expense also is eliminated.

In the illustrated embodiment, the slurry removal pipe 20 is illustrated offset from, although parallel to, the axis of the generator vessel 12. This arrangement results from the diameter dimensions of the particular generation vessel 12 illustrated and the necessity to position the reboiler 28 below the generator vessel 12. For larger vessels 12 than that illustrated where more space is available below the vessel, the slurry removal pipe 20 usually is located coaxially with the vessel.

In the interests of maintaining a compact form, it is preferred to dimension the reboiler 28 such that it lies wholly within the lateral dimension of the generator vessel 12. The actual lateral dimension of the reboiler 28 depends on the capacity of the generator vessel 12, the diameter of the slurry removal pipe 20 and the capacity of the pump 24.

While the vertical passageway 18 is illustrated as being provided to one side of the generator vessel 12, and discharging diametrically thereof, this structure represents only one possible but convenient arrangement. Another possibility is to construct the passageway or duct 18 in such a way that it terminates at its upper end in a circular or other conveniently shaped orifice located centrally of the generator vessel 12 above the liquid level of the reaction medium 13. A baffle may be provided vertically upwardly spaced from such a central orifice to direct the fluid discharging therefrom towards the generator vessel walls.

As described above, in the embodiment of FIGS. 1 and 2, the fluid entering the generator 12 does so generally radially of the generator vessel 12 and of the reaction medium 13. The embodiment shown in FIGS. 3 and 4 illustrates a modification of this arrangement whereby the internal baffle 14 is curved round within the vessel at its upper end to provide a vertically elongate rectangular exit orifice 44 opening along the internal wall of the vessel 12 and arranged to project the incoming fluid generally tangentially to the internal wall of the generator 12. The tangential entry of recycled fluid assists in the separation of entrained liquid from the gaseous phase enabling the vapor separation space 15 of the generator vessel 12 to be decreased in size.

In the generator vessel 12 of FIGS. 3 and 4, a more conventional conical bottom closure 16 and axial gaseous outlet 38 are used, although the structures utilized in the embodiment of FIGS. 1 and 2 may also be utilized herein.

It will be seen from the above description of the embodiments of FIGS. 1 to 4, that the pump 24, the reboiler 28 and the acid entry collar 32 are provided outside the generator vessel 12, although forming part of the overall modular unit 10. This arrangement of component parts is quite beneficial in permitting ready maintenance of each of these parts without disassembly of the whole unit or requiring access to the interior of the vessel 12. Accessibility for maintenance can be a drawback in more integrated structures, such as are described further below.

The structures shown in FIGS. 1 to 4, therefore, combine the component parts into a compact modular chlorine dioxide producing unit without the necessity of an integrated one vessel assembly and in which the component parts requiring service are readily accessible.

DESCRIPTION OF ALTERNATIVE EMBODIMENTS

The embodiment shown in FIG. 5 is an alternative to that shown in FIGS. 3 and 4 as to manner in which tangential entry of recycled mixture is attained. In FIG. 5, a rectangular opening 46 is provided in the side wall of the generator vessel 12 in communication with an external feed manifold 48, which communicates with the upper end of the second frusto-conical portion 36 through a pipe 50. This embodiment is less preferred, however, than that illustrated in FIGS. 3 and 4, in that an external flow path and associated piping is required, adding to the overall dimension of the generator unit 10 and is more costly to fabricate.

FIG. 6 illustrates an alternative heat exchanger location to that shown in FIGS. 1 to 4. In this embodiment, the heat exchanger 28 communicates directly with the lower outlet of the generator vessel 12, and the pipe 20 connects the pump chamber 24 with the first frusto-conical portion 30. This embodiment is less preferred than that illustrated in FIGS. 1 to 4, in view of the more difficult accessibility to the heat exchanger 28 for maintenance purposes in the embodiment.

In FIG. 7, there is illustrated a more integrated arrangement of the component parts of the chlorine dioxide generation unit of FIGS. 1 to 4. In this embodiment, the frusto-conical portions 30 and 36 and the acid inlet collar 32 are provided as parts of the internal baffling of the generator vessel 12.

In addition, the heat exchanger 28 is provided with downflow and upflow abutting portions 52 and 54. The downflow portion 52 communicates at its upper end directly with the generator vessel 12 and at the lower end with a baffled housing 56 containing pump 24. Sodium chlorate solution is fed to the pump housing 56 by line 22 and sodium sulphate slurry is removed therefrom by line 26. The upflow portion 54 communicates at its lower end with the pump housing 56 and at its upper end with the lower end of the first frusto-conical portion 30 within the generator unit 10. An alternative more conventional form of pump housing 58 for use with the heat exchanger 28 of FIG. 7 is illustrated in FIG. 8.

In the embodiment of FIGS. 7 and 8, accessibility to the reboiler 28 and the acid inlet collar 30 are difficult to achieve, with consequential maintenance problems. However, the integrated unit illustrated therein is superior to other integrated units, such as is illustrated in U.S. Pat. No. 4,079,123. For example, the latter unit permits only the use of dilute acid as feed, whereas concentrated acid can be used in the illustrated embodiment. Further, recycled material is discharged below the liquor surface in the prior art generator with consequential high liquor entrainment in the gaseous phase so that some form of demister device or a large vapor space is required for proper removal of entrained liquor. The latter problem does not arise in this invention since a multiphase mixture is discharged directly into the vapor space of the generator.

SUMMARY OF INVENTION

The present invention, therefore, provides improved procedures and improved apparatus for chlorine dioxide production. Modifications are possible within the scope of the invention.

What I claim is:

1. A modular chlorine dioxide generation unit, comprising:
   a generally cylindrical upright enclosed generator vessel for housing a liquid reaction medium capable of producing chlorine dioxide, chlorine and steam as gaseous product thereof and said solid by-product salt,
   a first outlet means located in a lower end closure of said vessel for removing a slurry of said solid by-product salt in admixture with reaction medium,
   a second outlet means located in an upper region of said vessel for removal of said gaseous product from a vapor space above the intended liquid level in said vessel,
   means within said generator vessel defining a fluid flow path from an inlet means located in said lower end closure of said vessel to a location above the intended liquid level in said generator which is out of direct fluid flow relationship with said reaction medium within said vessel,
   means defining a recycle flow path from said first outlet means to said inlet means, said recycle flow path means including pump means for pumping liquor around said recycle flow path, heat exchanger means for heating recycling liquor to the boiling temperature of the reaction medium under an applied subatmospheric pressure, first frusto-conical pipe means located downstream of said pump means and said heat exchanger means and having a decreasing cross-sectional dimension in the direction of liquid flow for exerting a back pressure on said recycling liquor to prevent boiling of the same in said recycle flow path upstream of said first frusto-conical pipe means, collar pipe means located downstream of said first frusto-conical pipe means and having acid inlet means for injection of strong mineral acid reactant into liquor passing through said collar pipe means and second frusto-conical pipe means located downstream of said collar pipe means and immediately upstream of said generator vessel inlet and having an increasing cross-sectional dimension in the direction of fluid flow to permit expansion of gases at low acceleration, and
   means for feeding alkali metal chlorate reactant to said recycle flow path.

2. The modular unit of claim 1 wherein recycle flow path comprises:
   first elongate conduit means extending downwardly from said first outlet means parallel to the axis of or coaxial with said vessel,
   inlet means to said first elongate conduit means constituting said means for feeding alkali metal chlorate reactant,
   said pump means located at the lower end of said first elongate conduit means,
   conduit means in fluid flow communication with said first elongate conduit means for removal of part of said slurry from said recycle flow path,
   said heat exchanger means being of elongate generally cylindrical structure and located extending from the discharge side of said pump means to the inlet side of said first frusto-conical pipe means in generally parallel relation to said first conduit means, and
   said first and second frusto-conical sections and said collar pipe means are coaxial with said heat exchanger means.

3. The modular unit of claim 1 wherein said recycle flow path comprises:
   said heat exchanger means being of elongate generally cylindrical structure and located extending downwardly from said first outlet means parallel to the axis of or coaxial with said vessel,
   said pump means located at the lower end of said heat exchanger means,
   inlet means between said heat exchanger means and said pump means constituting said means for feeding alkali metal chlorate reactant,
   first conduit means in fluid flow communication with said recycle flow path downstream of said inlet means for removal of part of said slurry from said recycle flow path, second conduit means extending upwardly from the discharge side of said pump to the inlet side of said first frusto-conical pipe means generally parallel to said first conduit means, and said first and second frusto-conical sections and said collar pipe means are coaxial with said heat exchanger means.

4. The modular unit of claim 1 wherein said means within said generator is a baffle extending upwardly from the said lower end closure adjacent the internal wall of said generator vessel to define a flow path extending parallel to the axis of the generator.

5. The modular unit of claim 1 wherein said means within said generator is a baffle extending first upwardly from said lower end closure then curved following the internal wall of the vessel to terminate in an elongate opening extending generally parallel to the axis of the vessel for ejection of recycled fluid tangentially of the vessel wall.

6. The modular unit of claim 1 wherein said lower end closure is dished outwardly of the generator vessel.

7. The modular unit of claim 1, 2, 3, 4, 5, or 6 wherein said second outlet means comprises a conduit extending from the exterior of the vessel generally radially through the vessel wall, in an upper region thereof and terminating in an upwardly-opening orifice having its centre of curvature substantially lying on the axis of the vessel.

8. A chlorine dioxide generating vessel, comprising:
a generally cylindrical upright enclosed body for housing a liquid medium capable of producing chlorine dioxide, chlorine and steam as gaseous products thereof and a solid by-product salt,
first outlet means located in a lower end closure of said body for removing a slurry of said solid by-product salt in admixture with reaction medium from said body,
second outlet means located in an upper region of said body for removal of said gaseous product from a vapor space above the intended liquid level in said body,
a baffle extending within said enclosed body upwardly from said lower end closure in communication with an inlet for said reaction mixture adjacent the internal wall of said generator vessel to above the intended liquid level in said body to define said inlet means for said reaction mixture from external said body,
said second outlet means comprising a conduit extending from exterior of the vessel generally radially through the body wall in an upper region thereof and terminating in an upwardly-opening orifice having its centre of curvature substantially lying on the axis of the vessel.

9. The chlorine dioxide generating vessel of claim 8 including a baffle within said enclosed body extending from said lower end closure in communication with an inlet for said reaction mixture first upwardly adjacent to the internal of the body and then curved following the internal wall to terminate in an elongate opening located above the intended liquid level in said body and extending generally parallel to the axis of the body for ejection of recycled mixture tangentially of the vessel wall to define said inlet means for said reaction mixture from external said body.

10. A chlorine dioxide generating vessel, comprising:
a generally cylindrical upright enclosed body for housing a liquid medium capable of producing chlorine dioxide, chlorine and steam as gaseous products thereof and a solid by-product salt,
first outlet means located in a lower end closure of said body for removing a slurry of said solid by-product salt in admixture with reaction medium from said body,
second outlet means located in an upper region of said body for removal of said gaseous product from a vapor space above the intended liquid level in said body, and
inlet means located above the intended liquid level in said body for feeding reaction mixture to said body, said inlet means comprising a generally rectangular opening in the body wall and external conduit means having a first portion coinciding with said opening decreasing in distance from said opening from one circumferential extremity of said opening to the other, a second portion extending along the outer wall of said body and an inlet arranged to feed material vertically upwardly into said second portion, said inlet means projecting reaction mixture into said body generally tangentially to the wall thereof.

11. An integrally-formed modular chlorine dioxide generating unit comprising:
a generally cylindrical upright enclosed generator vessel having conduit means extending upwardly therein to separate the vessel into a reaction medium containing zone and a recycle liquor flow path extending through the vessel out of direct fluid flow relationship with said reaction medium and discharging to an upper vapor space region of said vessel,
a heat exchange chamber extending from the lower end of said vessel and having a downward fluid flow portion in communication with said reaction medium-containing zone and an upward fluid flow portion in communication with said recycle liquor flow path,
pump means located at the lower end of said heat exchange chamber for transfer of liquid from said downward fluid flow portion to said upward fluid flow portion,
first reactant inlet means communicating with the lower end of said heat exchange chamber for feed of alkali metal chlorate reactant thereto, and
second reactant inlet means communicating with said conduit means for feed of strong mineral acid thereto,
said conduit means comprising:
a first frusto-conical portion located at the lower end thereof in direct communication with the upper end of said upward fluid flow portion of said heat exchange chamber and having a decreasing cross-sectional dimension in the direction of liquid flow for exerting a back pressure in recycling liquid,
a collar portion located downstream of said first frusto-conical portion and having said second reactant inlet means communicating therewith,
a second frusto-conical portion located downstream of said collar portion and having an increasing cross-sectional dimension in the direction of fluid flow to permit expansion of gases at low acceleration, and
an elongate pipe portion extending from the downstream end of said second frusto-conical portion to said discharge.

* * * * *